US012617397B2

(12) United States Patent
Ohsugi

(10) Patent No.: US 12,617,397 B2
(45) Date of Patent: May 5, 2026

(54) TRAVELING CONTROL DEVICE, TRAVELING CONTROL METHOD, AND NON-TRANSITORY RECORDING MEDIUM

(71) Applicant: TOYOTA JIDOSHA KABUSHIKI KAISHA, Toyota (JP)

(72) Inventor: Masamichi Ohsugi, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 13 days.

(21) Appl. No.: 18/983,902

(22) Filed: Dec. 17, 2024

(65) Prior Publication Data

US 2025/0196857 A1     Jun. 19, 2025

(30) Foreign Application Priority Data

Dec. 19, 2023    (JP) ................................. 2023-214070

(51) Int. Cl.
B60W 30/12          (2020.01)
B60W 30/18          (2012.01)

(52) U.S. Cl.
CPC ...... B60W 30/12 (2013.01); B60W 30/18159 (2020.02); B60W 30/18163 (2013.01); B60W 2520/06 (2013.01); B60W 2552/10 (2020.02)

(58) Field of Classification Search
CPC ........... B60W 30/12; B60W 30/18159; B60W 30/18163; B60W 2520/06; B60W 2552/10; B60W 2552/53; B60W 30/18009; B60W 40/06; B60W 2552/00; B60W 2554/4044
USPC ........................................................ 701/41
See application file for complete search history.

(56) References Cited

U.S. PATENT DOCUMENTS

| | | | | |
|---|---|---|---|---|
| 2021/0357663 | A1* | 11/2021 | Okada ................. | B60W 60/001 |
| 2022/0306116 | A1* | 9/2022 | Hashimoto ....... | B60W 60/0053 |
| 2023/0150508 | A1* | 5/2023 | Nimura ........... | B60W 30/18163 |
| | | | | 701/41 |
| 2023/0230390 | A1 | 7/2023 | Takahashi | |

FOREIGN PATENT DOCUMENTS

| | | |
|---|---|---|
| JP | 2019-015690 A | 1/2019 |
| JP | 2022-043996 A | 3/2022 |
| JP | 2023-104348 A | 7/2023 |

* cited by examiner

*Primary Examiner* — Yi-Kai Wang

(74) *Attorney, Agent, or Firm* — Dinsmore & Shohl LLP

(57) ABSTRACT

A traveling control device determines whether a travel direction of an own lane in which a host vehicle is traveling and the travel direction of an adjoining lane adjoining the own lane are the same, determines whether structure of a road on which the host vehicle is traveling changes, and restricts movement of the host vehicle from the own lane to the adjoining lane when it is determined that the structure of the road on which the host vehicle is traveling changes after it is determined that the travel direction of the own lane and the travel direction of the adjoining lane are the same.

9 Claims, 6 Drawing Sheets

TRAVELING CONTROL DEVICE, TRAVELING CONTROL METHOD, AND NON-TRANSITORY RECORDING MEDIUM

CROSS-REFERENCE TO RELATED APPLICATIONS

This application claims priority to Japanese Patent Application No. 2023-214070 filed Dec. 19, 2023, the entire contents of which are herein incorporated by reference.

FIELD

The present disclosure relates to traveling control device, traveling control method, and non-transitory recording medium.

BACKGROUND

PTL 1 (Japanese Unexamined Patent Publication No. 2019-015690) describes art in which lane changes are made as little as possible after passing through an intersection.

In the art described in PTL 1, navigation is performed so that the lane changes are made as little as possible after passing through the intersection in order to lighten the burden on the driver. That is, in the art described in PTL 1, it is not confirmed whether a travel direction of an own lane in which a host vehicle is traveling and the travel direction of an adjoining lane adjoining the own lane are the same. For this reason, in the art described in PTL 1, the host vehicle is liable to end up moving from the own lane to the adjoining lane whose travel direction is opposite to the travel direction of the own lane and traveling in reverse.

SUMMARY

In consideration of the above-mentioned point, it is an object of the present disclosure to provide traveling control device, traveling control method, and non-transitory recording medium which can suppress reverse traveling of an own vehicle after road structure changes.

(1) One aspect of the present disclosure is a traveling control device including a processor configured to: determine whether a travel direction of an own lane in which a host vehicle is traveling and the travel direction of an adjoining lane adjoining the own lane are the same; determine whether structure of a road on which the host vehicle is traveling changes; and restrict movement of the host vehicle from the own lane to the adjoining lane when it is determined that the structure of the road on which the host vehicle is traveling changes after it is determined that the travel direction of the own lane and the travel direction of the adjoining lane are the same.

(2) In the traveling control device of the aspect (1), the processor may be configured to clear the determination result that the travel direction of the own lane and the travel direction of the adjoining lane are the same when it is determined that the structure of the road on which the host vehicle is traveling changes after it is determined that the travel direction of the own lane and the travel direction of the adjoining lane are the same.

(3) In the traveling control device of the aspect (1) or (2), the processor may be configured to again determine whether the travel direction of the own lane and the travel direction of the adjoining lane are the same based on the information obtained after it is determined that the structure of the road on which the host vehicle is traveling changes when it is determined that the structure of the road on which the host vehicle is traveling changes after it is determined that the travel direction of the own lane and the travel direction of the adjoining lane are the same.

(4) In the traveling control device of any one of the aspects (1) to (3), the processor may be configured to allow the movement of the host vehicle from the own lane to the adjoining lane when it is determined that the structure of the road on which the host vehicle is traveling does not change after it is again determined that the travel direction of the own lane and the travel direction of the adjoining lane are the same.

(5) In the traveling control device of any one of the aspects (1) to (4), the processor may be configured to determine that the structure of the road on which the host vehicle is traveling changes when the number of lanes included in the road on which the host vehicle is traveling increases.

(6) In the traveling control device of any one of the aspects (1) to (5), the processor may be configured to determine that the structure of the road on which the host vehicle is traveling changes when the number of lanes included in the road on which the host vehicle is traveling decreases.

(7) In the traveling control device of any one of the aspects (1) to (6), the processor may be configured to determine that the structure of the road on which the host vehicle is traveling changes when an intersecting road intersecting the road on which the host vehicle is traveling exists.

(8) Another aspect of the present disclosure is a traveling control method including: determining whether a travel direction of an own lane in which a host vehicle is traveling and the travel direction of an adjoining lane adjoining the own lane are the same; determining whether structure of a road on which the host vehicle is traveling changes; and restricting movement of the host vehicle from the own lane to the adjoining lane when it is determined that the structure of the road on which the host vehicle is traveling changes after it is determined that the travel direction of the own lane and the travel direction of the adjoining lane are the same.

(9) Another aspect of the present disclosure is a non-transitory recording medium having recorded thereon a computer program for causing a processor to perform a process including: determining whether a travel direction of an own lane in which a host vehicle is traveling and the travel direction of an adjoining lane adjoining the own lane are the same; determining whether structure of a road on which the host vehicle is traveling changes; and restricting movement of the host vehicle from the own lane to the adjoining lane when it is determined that the structure of the road on which the host vehicle is traveling changes after it is determined that the travel direction of the own lane and the travel direction of the adjoining lane are the same.

According to the present disclosure, it is possible to suppress the reverse traveling of the own vehicle after the road structure changes.

BRIEF DESCRIPTION OF DRAWINGS

FIG. 7 is a view showing one example in which a traveling control unit 3D allows movement (lane change) of the host vehicle 1 from the own lane L16 to the adjoining lane L26.

DESCRIPTION OF EMBODIMENTS

Figure 1:
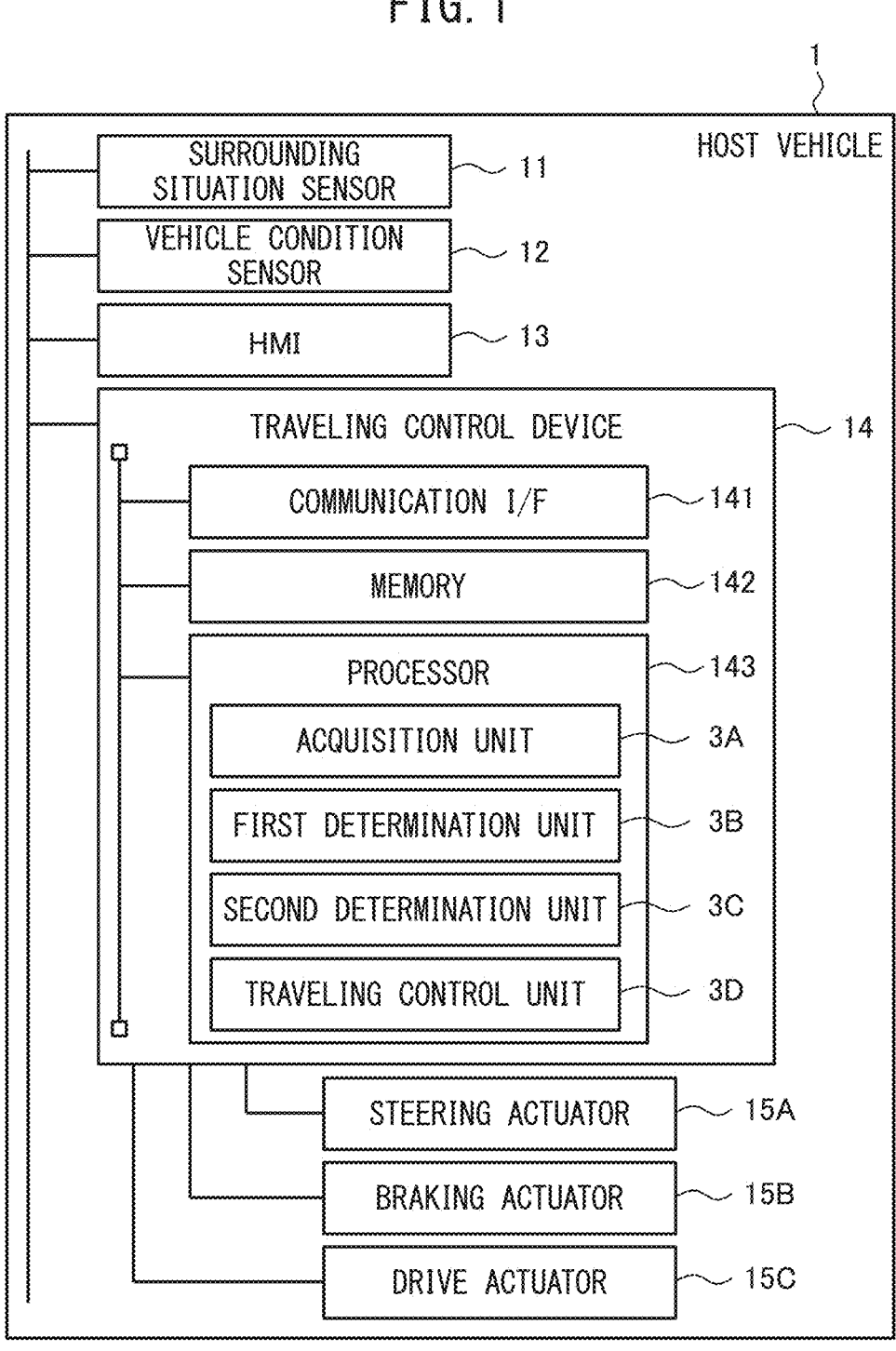
FIG. 1 is a view showing one example of a host vehicle 1 to which a traveling control device 14 of a first embodiment is applied.

Below, referring to the drawings, embodiments of traveling control device, traveling control method, and non-transitory recording medium of the present disclosure will be explained.

First Embodiment

FIG. 1 is a view showing one example of a host vehicle 1 to which a traveling control device 14 of a first embodiment is applied.

In the example shown in FIG. 1, the host vehicle 1 is provided with surrounding situation sensor 11, vehicle condition sensor 12, HMI (human machine interface) 13, traveling control device 14, steering actuator 15A, braking actuator 15B, and drive actuator 15C.

The surrounding situation sensor 11 detects objects (for example, traffic signs, surrounding vehicles, structure, etc.) existing in the surroundings of the host vehicle 1 and sends the detection result to the traveling control device 14. The surrounding situation sensor 11 includes, for example, camera shooting the front, side, rear, etc. of the host vehicle 1, LiDAR (Light Detection And Ranging), radar, sonar, or the like.

The vehicle condition sensor 12 detects condition of the host vehicle 1 and sends the detection result to the traveling control device 14. The vehicle condition sensor 12, for example, includes speed sensor, acceleration sensor, or the like.

The HMI 13 has the function of receiving various operations by the driver of the host vehicle 1, the function of outputting information by display, voice, etc. to the driver of the host vehicle 1, etc. and sends signals showing the operations of the driver of the host vehicle 1 to the traveling control device 14.

The traveling control device 14 controls a traveling of the host vehicle 1. In more detail, the traveling control device 14 is configured by a driving assistance ECU (electronic control unit) and, for example, controls the steering actuator 15A, the braking actuator 15B, and the drive actuator 15C based on the information (data, signals) sent from the surrounding situation sensor 11, the vehicle condition sensor 12, and the HMI 13.

The traveling control device 14 is configured by a microcomputer provided with communication interface (I/F) 141, memory 142, and processor 143. The communication interface 141 has an interface circuit for connecting the traveling control device 14 to the surrounding situation sensor 11, the vehicle condition sensor 12, the HMI 13, the steering actuator 15A, the braking actuator 15B, and the drive actuator 15C. The memory 142 stores a program used in a process performed by the processor 143 and various data. The processor 143 has the function as an acquisition unit 3A, the function as a first determination unit 3B, the function as a second determination unit 3C, and the function as a traveling control unit 3D.

The acquisition unit 3A acquires the detection result of the surrounding situation sensor 11, the detection result of the vehicle condition sensor 12, the signals showing the operations of the driver of the host vehicle 1 received by the HMI 13, etc.

The first determination unit 3B determines whether the travel direction of the own lane L11/L12 (see FIG. 2 and FIG. 3) in which the host vehicle 1 is traveling and the travel direction of the adjoining lane L21/L22 (see FIG. 2 and FIG. 3) adjoining the own lane L11/L12 are the same based on the detection result of the surrounding situation sensor 11 acquired by the acquisition unit 3A. The first determination unit 3B, for example, uses a model obtained by learning using teacher data which is a dataset of the detection result of the surrounding situation sensor mounted in a learning vehicle and a label showing whether the travel direction of the own lane in which the learning vehicle is traveling and the travel direction of the adjoining lane adjoining the own lane are the same so as to determine whether the travel direction of the own lane L11/L12 in which the host vehicle 1 is traveling and the travel direction of the adjoining lane L21/L22 adjoining the own lane L11/L12 are the same based on the detection result of the surrounding situation sensor 11.

In an example where the surrounding situation sensor 11 includes the camera for shooting the front of the host vehicle 1, the acquisition unit 3A acquires a camera image as the detection result of the surrounding situation sensor 11, when the traffic signs for the own lane face the host vehicle 1 and the traffic signs for the adjoining lane appear backwards from the host vehicle 1, the first determination unit 3B determines that the travel direction of the own lane and the travel direction of the adjoining lane are not the same. When the traffic signs for the own lane face the host vehicle 1 and the traffic signs for the adjoining lane face the host vehicle 1, the first determination unit 3B determines that the travel direction of the own lane and the travel direction of the adjoining lane are the same.

In another example (example where the acquisition unit 3A acquires the detection result of the LiDAR, the radar, the sonar or the like as the detection result of the surrounding situation sensor 11), the first determination unit 3B may determine whether the travel direction of the own lane L11/L12 and the travel direction of the adjoining lane L21/L22 are the same based on the relative speed of a preceding vehicle and the host vehicle 1 traveling in the own lane L11/L12 and the relative speed of a surrounding vehicle traveling in the adjoining lane L21/L22 and the host vehicle 1. In this example, when the (absolute value of) relative speed of the surrounding vehicle traveling in the adjoining lane L21/L22 and the host vehicle 1 is considerably larger compared with the (absolute value of) relative speed of the preceding vehicle and the host vehicle 1 traveling in the own lane L11/L12 (for example, when the relative speed of the surrounding vehicle traveling in the adjoining lane L21/L22 and the host vehicle 1 is about two times the speed limit of the own lane L11/L12 etc.), the first determination unit 3B determines that the travel direction of the own lane L11/L12 and the travel direction of the adjoining lane L21/L22 are not the same.

Figure 2:
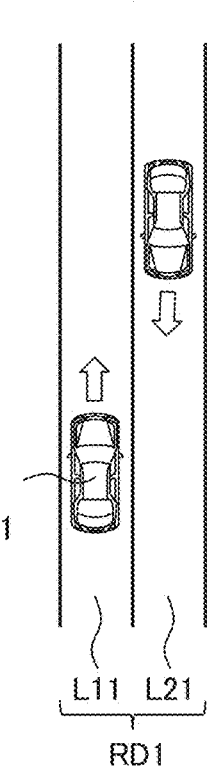
FIG. 2 is a view showing one example in which a first determination unit 3B determines that a travel direction of an own lane L11 in which the host vehicle 1 is traveling and the travel direction of an adjoining lane L21 adjoining the own lane L11 are not the same.

FIG. 2 is a view showing an example where the first determination unit 3B determines that the travel direction of the own lane L11 in which the host vehicle 1 is traveling and the travel direction of the adjoining lane L21 adjoining the own lane L11 are not the same. In the example shown in FIG. 2, the own lane L11 and the adjoining lane L21 (opposite lane) whose travel direction is opposite to the travel direction of the own lane L11 are included in a road RD1 on which the host vehicle 1 is traveling.

Figure 3:
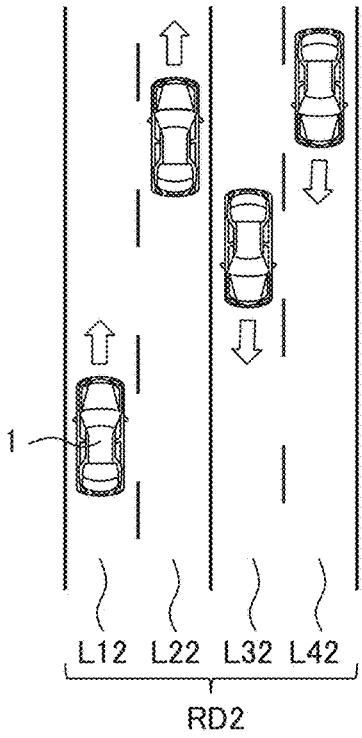
FIG. 3 is a view showing one example in which the first determination unit 3B determines that the travel direction of the own lane L12 in which the host vehicle 1 is traveling and the travel direction of the adjoining lane L22 adjoining the own lane L12 are the same.

FIG. 3 is a view showing one example in which the first determination unit 3B determines that the travel direction of the own lane L12 in which the host vehicle 1 is traveling and the travel direction of the adjoining lane L22 adjoining the own lane L12 are the same. In the example shown in FIG. 3, the own lane L12, the adjoining lane L22 whose travel direction the same as the travel direction of the own lane L11, and the opposite lanes L32, L42 whose travel direction is opposite to the travel direction of the own lane L12 are included in the road RD2 on which the host vehicle 1 is traveling.

In the example shown in FIG. 1, the second determination unit 3C determines whether the structure of the roads RD3 to RD5 (see FIG. 4 to FIG. 6) on which the host vehicle 1 is traveling changes based on the detection result of the surrounding situation sensor 11 acquired by the acquisition unit 3A. The second determination unit 3C, for example, uses a model obtained by learning using teacher data which is a dataset of the detection result of the surrounding situation sensors mounted in the learning vehicle and a label showing whether the structure of the road on which the learning vehicle is traveling changes so as to determine whether the structure of the roads RD3 to RD5 on which the host vehicle 1 is traveling changes based on the direction result of the surrounding situation sensor 11.

The second determination unit 3C, for example, determines that the structure of the road RD3 (see FIG. 4) on which the host vehicle 1 is traveling changes when the number of lanes included in the road RD3 on which the host vehicle 1 is traveling increases.

Figure 4:
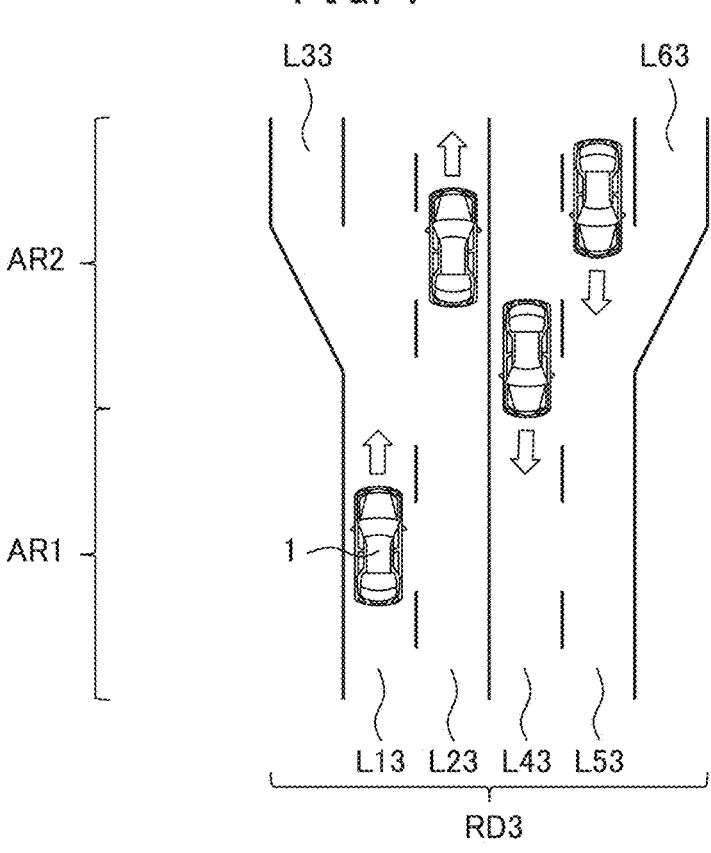
FIG. 4 is a view showing one example in which a second determination unit 3C determines that structure of a road RD3 on which the host vehicle 1 is traveling changes.

FIG. 4 is a view showing one example in which the second determination unit 3C determines that the structure of the road RD3 on which the host vehicle 1 is traveling changes.

In the example shown in FIG. 4, in an area AR1, the own lane L13, the adjoining lane L23 whose travel direction and the travel direction of the own lane L13 are the same, and the opposite lanes L43, L53 whose travel direction is opposite to the travel direction of the own lane L13 are included in the road RD3 on which the host vehicle 1 is traveling. For this reason, while the host vehicle 1 is traveling in the area AR1, the first determination unit 3B determines that the travel direction of the own lane L13 in which the host vehicle 1 is traveling and the travel direction of the adjoining lane L23 adjoining the own lane L13 are the same. In the area AR2, the own lane L13, the adjoining lanes L23, L33 whose travel direction and the travel direction of the own lane L13 are the same, and the opposite lanes L43, L53, L63 whose travel direction is opposite to the travel direction of the own lane L13 are included in the road RD3 on which the host vehicle 1 is traveling. That is, in the area AR2, the number of lanes included in the road RD3 on which the host vehicle 1 is traveling increases over the area AR1. For this reason, while the host vehicle 1 is traveling in the area AR2, the second determination unit 3C determines that the structure of the road RD3 on which the host vehicle 1 is traveling changes.

In the example shown in FIG. 1, even when, for example, the number of lanes included in the road RD4 (see FIG. 5) on which the host vehicle 1 is traveling decreases, the second determination unit 3C determines that the structure of the road RD4 on which the host vehicle 1 is traveling changes.

Figure 5:
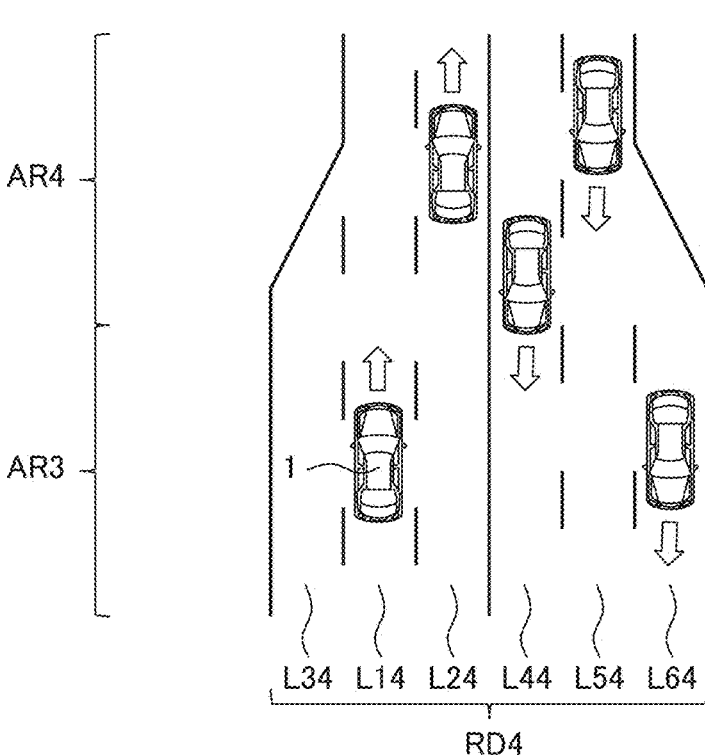
FIG. 5 is a view showing another example in which the second determination unit 3C determines that the structure of the road RD4 on which the host vehicle 1 is traveling changes.

FIG. 5 is a view showing another example in which the second determination unit 3C determines that the structure of the road RD4 on which the host vehicle 1 is traveling changes.

In the example shown in FIG. 5, in the area AR3, the own lane L14, the adjoining lanes L24, L34 whose travel direction and the travel direction of the own lane L14 are the same, and the opposite lanes L44, L54, L64 whose travel direction is opposite to the travel direction of the own lane L14 are included in the road RD4 on which the host vehicle 1 is traveling. For this reason, while the host vehicle 1 is traveling in the area AR3, the first determination unit 3B determines that the travel direction of the own lane L14 in which the host vehicle 1 is traveling and the travel direction of the adjoining lanes L24, L34 adjoining the own lane L14 are the same. In the area AR4, the own lane L14, the adjoining lane L24 whose travel direction and the travel direction of the own lane L14 are the same, and the opposite lanes L44, L54 whose travel direction is opposite to the travel direction of the own lane L14 are included in the road RD4 on which the host vehicle 1 is traveling. That is, in the area AR4, the number of lanes included in the road RD4 on which the host vehicle 1 is traveling decreases from the area AR3. For this reason, while the host vehicle 1 is traveling in the area AR4, the second determination unit 3C determines that the structure of the road RD4 on which the host vehicle 1 is traveling changes.

In the example shown in FIG. 1, when, for example, an intersecting road RD5A (see FIG. 6) intersecting the road RD5 (see FIG. 6) on which the host vehicle 1 is traveling exists, the second determination unit 3C determines that the structure of the road RD5 on which the host vehicle 1 is traveling changes.

Figure 6:
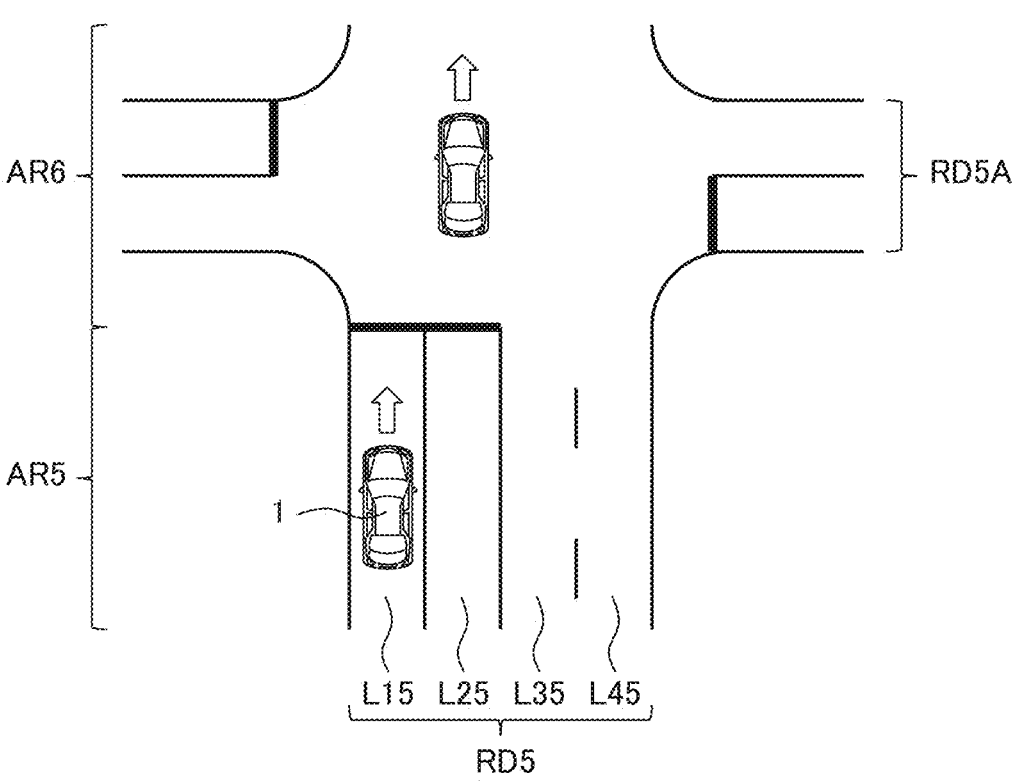
FIG. 6 is a view showing another example in which the second determination unit 3C determines that the structure of the road RD5 on which the host vehicle 1 is traveling changes.

FIG. 6 is a view showing another example in which the second determination unit 3C determines that the structure of the road RD5 on which the host vehicle 1 is traveling changes.

In the example shown in FIG. 6, in the area AR5, the own lane L15, the adjoining lane L25 whose travel direction and the travel direction of the own lane L15 are the same, and the opposite lanes L35, L45 whose travel direction is opposite to the travel direction of the own lane L15 are included in the road RD5 on which the host vehicle 1 is traveling. For this reason, while the host vehicle 1 is traveling in the area AR5, the first determination unit 3B determines that the travel direction of the own lane L15 in which the host vehicle 1 is traveling and the travel direction of the adjoining lane L25 adjoining the own lane L15 are the same. In the area AR6, the intersecting road RD5A intersecting the road RD5 on which the host vehicle 1 is traveling exists. For this reason, while the host vehicle 1 is traveling in the area AR6, the second determination unit 3C determines that the structure of the road RD5 on which the host vehicle 1 is traveling changes compared with the area AR5.

In the example shown in FIG. 1, the traveling control unit 3D restricts movement (in more detail, a lane change) of the host vehicle 1 from the own lane to the adjoining lane when the second determination unit 3C determines that the structure of the road on which the host vehicle 1 is traveling changes after the first determination unit 3B determines that the travel direction of the own lane and the travel direction of the adjoining lane are the same. Further, the first determination unit 3B clears the determination result that the travel direction of the own lane and the travel direction of the adjoining lane are the same when the second determination unit 3C determines that the structure of the road on which the host vehicle 1 is traveling changes after the first determination unit 3B determines that the travel direction of the own lane and the travel direction of the adjoining lane are the same.

Specifically, in the example shown in FIG. 4, the second determination unit 3C determines that the structure of the road RD3 on which the host vehicle 1 is traveling changes while the host vehicle 1 is traveling in the area AR2 after the first determination unit 3B determines that the travel direction of the own lane L13 and the travel direction of the adjoining lane L23 are the same while the host vehicle 1 is traveling in the area AR1. For this reason, the traveling control unit 3D restricts the movement (lane change) of the host vehicle 1 from the own lane L13 to the adjoining lanes L23, L33 in the area AR2. Further, the first determination unit 3B clears the determination result that the travel direction of the own lane L13 and the travel direction of the adjoining lane L23 are the same, the determination is made while the host vehicle 1 is traveling in the area AR1.

In the example shown in FIG. 5, the second determination unit 3C determines that the structure of the road RD4 on which the host vehicle 1 is traveling changes while the host vehicle 1 is traveling in the area AR4 after the first determination unit 3B determines that the travel direction of the own lane L14 and the travel direction of the adjoining lanes L24, L34 are the same while the host vehicle 1 is traveling in the area AR3. For this reason, the traveling control unit 3D restricts the movement (lane change) of the host vehicle 1 from the own lane L14 to the adjoining lane L24 in the area AR4. Further, the first determination unit 3B clears the determination result that the travel direction of the own lane L14 and the travel direction of the adjoining lanes L24, L34 are the same, the determination is made while the host vehicle 1 is traveling in the area AR3.

In the example shown in FIG. 6, the second determination unit 3C determines that the structure of the road RD5 on which the host vehicle 1 is traveling changes while the host vehicle 1 is traveling in the area AR6 after the first determination unit 3B determines that the travel direction of the own lane L15 and the travel direction of the adjoining lane L25 are the same while the host vehicle 1 is traveling in the area AR5. For this reason, the traveling control unit 3D restricts the movement (lane change) of the host vehicle 1 from the own lane L15 to the adjoining lane L25 in the area AR6. Further, the first determination unit 3B clears the determination result that the travel direction of the own lane L15 and the travel direction of the adjoining lane L25 are the same, the determination is made while the host vehicle 1 is traveling in the area AR5.

In the example shown in FIG. 1, the first determination unit 3B again determines whether the travel direction of the own lane L16 (see FIG. 7) and the travel direction of the adjoining lane L26 (see FIG. 7) are the same based on the information (in more detail, the detection result of the surrounding situation sensor 11) obtained after the second determination unit 3C determines that the structure of the road RD6 (see FIG. 7) on which the host vehicle 1 is traveling changes when the second determination unit 3C determines that the structure of the road RD6 on which the host vehicle 1 is traveling changes after the first determination unit 3B determines that the travel direction of the own lane L16 and the travel direction of the adjoining lane L26 are the same. An intersecting road RD6A intersects the road RD6.

The traveling control unit 3D allows the movement (lane change) of the host vehicle 1 from the own lane L16 to the adjoining lane L26 when the second determination unit 3C determines that the structure of the road RD6 on which the host vehicle 1 is traveling does not change after the first determination unit 3B again determines that the travel direction of the own lane L16 and the travel direction of the adjoining lane L26 are the same.

Figure 7:
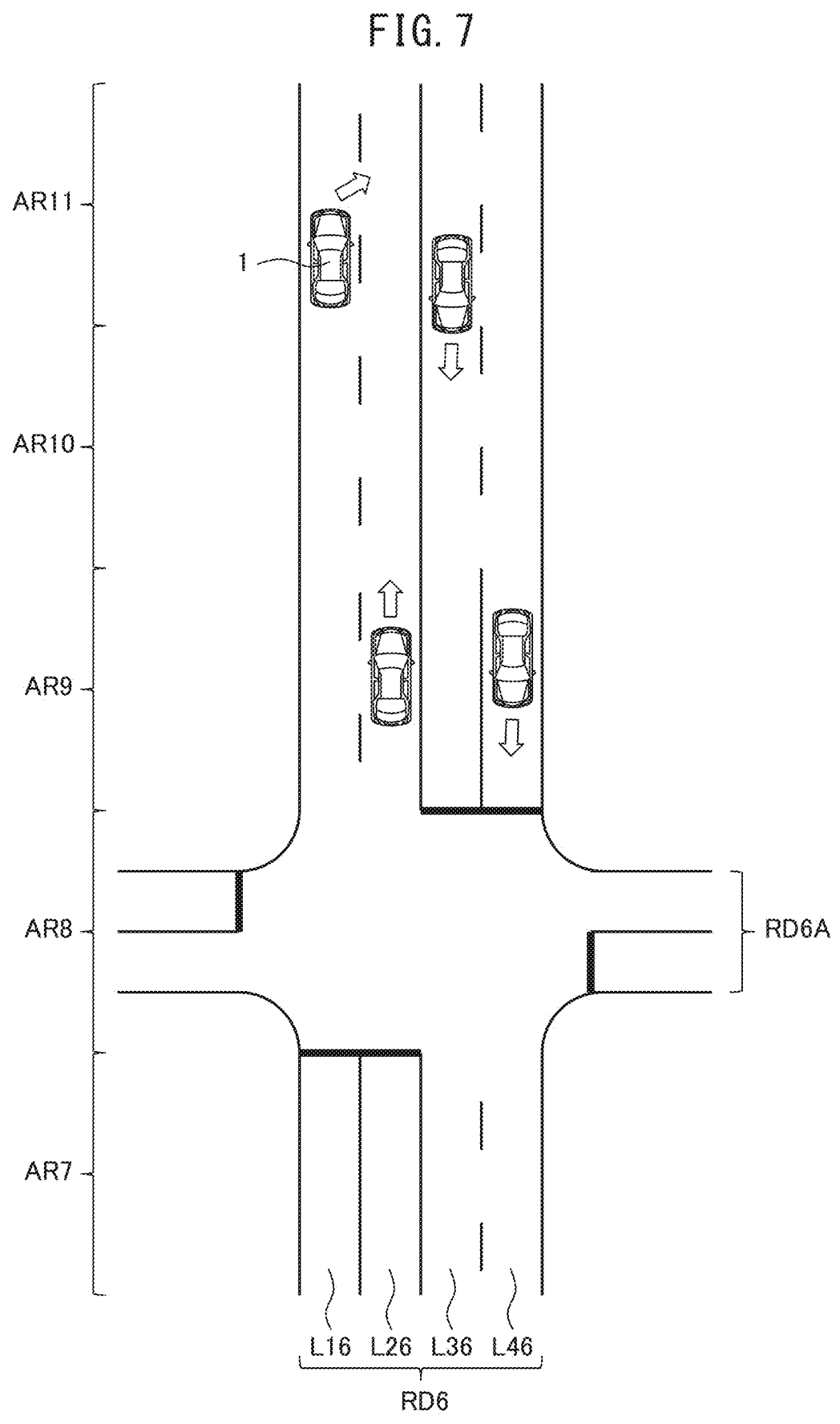

FIG. 7 is a view showing one example in which the traveling control unit 3D allows the movement (lane change) of the host vehicle 1 from the own lane L16 to the adjoining lane L26.

In the example shown in FIG. 7, the second determination unit 3C determines that the structure of the road RD6 on which the host vehicle 1 is traveling changes while the host vehicle 1 is traveling in the area AR8 after the first determination unit 3B determines that the travel direction of the own lane L16 and the travel direction of the adjoining lane L26 are the same while the host vehicle 1 is traveling in the area AR7. For this reason, the first determination unit 3B again determines whether the travel direction of the own lane L16 and the travel direction of the adjoining lane L26 are the same while the host vehicle 1 is traveling in the area AR9 based on the information (in more detail, the detection result of the surrounding situation sensor 11) obtained after the second determination unit 3C determines that the structure of the road RD6 on which the host vehicle 1 is traveling changes (in more detail, while the host vehicle 1 is traveling in the area AR9).

In the example shown in FIG. 7, the travel direction of the own lane L16 and the travel direction of the adjoining lane L26 are the same in the area AR9 as well. Accordingly, the second determination unit 3C determines whether the structure of the road RD6 on which the host vehicle 1 is traveling changes while the host vehicle 1 is traveling in the area AR10.

In the example shown in FIG. 7, the structure of the road RD6 on which the host vehicle 1 is traveling does not change in the area AR10. Accordingly, the traveling control unit 3D allows the movement (lane change) of the host vehicle 1 from the own lane L16 to the adjoining lane L26 while the host vehicle 1 is traveling in the area AR11.

In the example shown in FIG. 1, when the traveling control unit 3D restricts the movement (lane change) of the host vehicle 1 from the own lane L16 to the adjoining lane L26 (for example, while the host vehicle 1 is traveling in the areas AR7 to AR10), and when the host vehicle 1 is about to move from the own lane L16 to the adjoining lane L26 or the like (when the host vehicle 1 departs from the own lane L16), the traveling control device 14 (driving assistance ECU) makes the HMI 13 output an alert. For this reason, in the example shown in FIG. 1, for example, it is possible to suppress that the own vehicle 1 travels on the opposite lanes L36, L46 in reverse after the structure of the road changes (while the host vehicle 1 is traveling in the areas AR8 to AR10) or the like.

In another example, when the traveling control unit 3D restricts the movement (lane change) of the host vehicle 1 from the own lane L16 to the adjoining lane L26 (for example, while the host vehicle 1 is traveling in the areas AR7 to AR10), and when the host vehicle 1 is about to move from the own lane L16 to the adjoining lane L26 or the like (when the host vehicle 1 departs from the own lane L16), the traveling control device 14 (driving assistance ECU) may control the steering actuator 15A so as to perform steering assist for suppressing the departure of the host vehicle 1 from the own lane L16.

In the example shown in FIG. 1, when the traveling control unit 3D allows the movement (lane change) of the host vehicle 1 from the own lane L16 to the adjoining lane L26 (for example, while the host vehicle 1 is traveling in the area AR11), and when the host vehicle 1 changes lanes from the own lane L16 to the adjoining lane L26, the traveling control device 14 (driving assistance ECU) does not allow the HMI 13 to output the alert.

Figure 8:
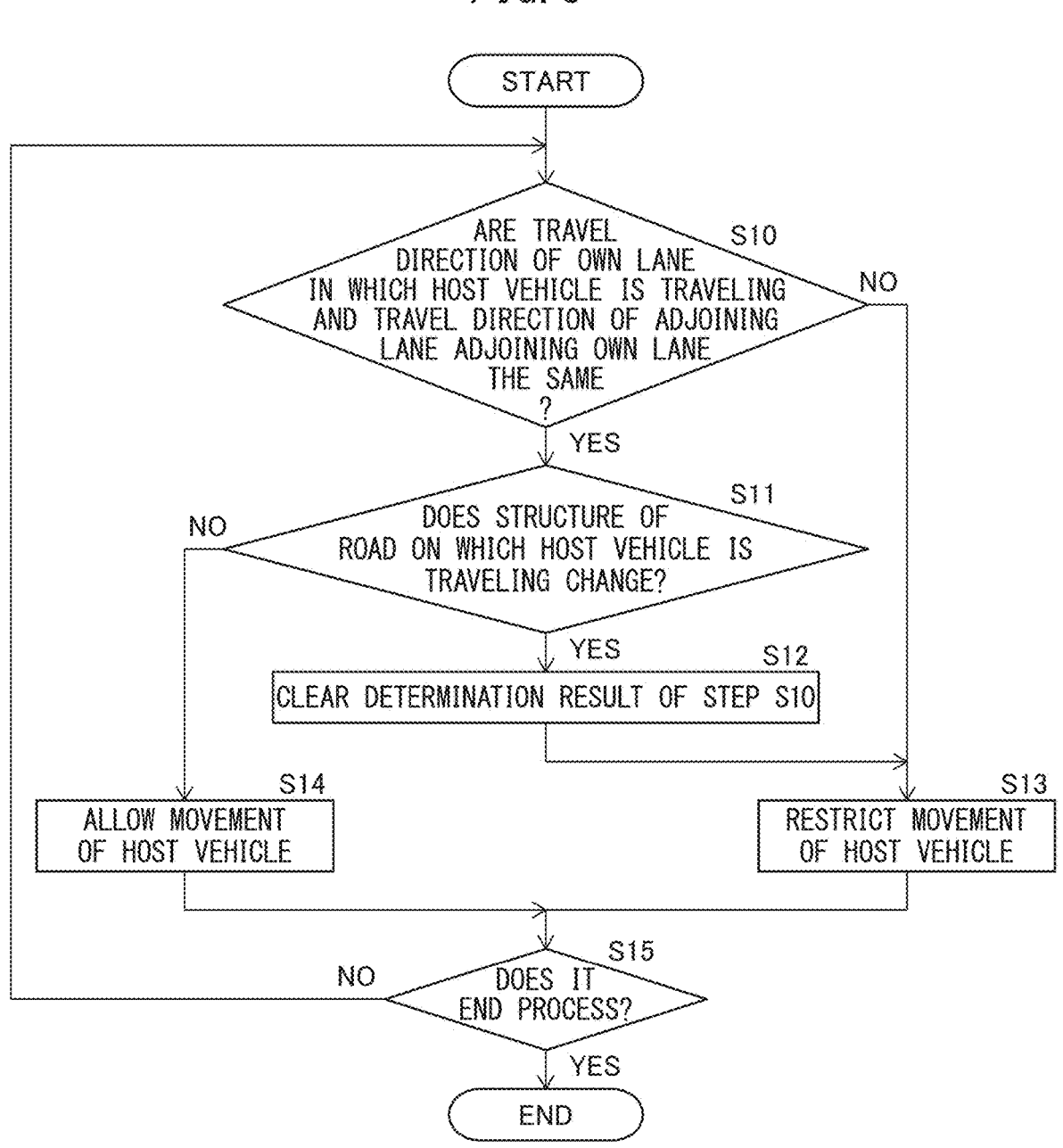
FIG. 8 is a flow chart for explaining one example of a process performed by a processor 143 of the traveling control device 14 of the first embodiment.

FIG. 8 is a flow chart for explaining one example of the process performed by the processor 143 of the traveling control device 14 of the first embodiment.

In the example shown in FIG. 8, at step S10, the first determination unit 3B determines whether the travel direction of the own lane in which the host vehicle 1 is traveling and the travel direction of the adjoining lane adjoining the own lane are the same based on the detection result of the surrounding situation sensor 11 acquired at step not shown. When YES, it proceeds to step S11 and when NO, it proceeds to step S13.

At step S11, the second determination unit 3C determines whether the structure of the road on which the host vehicle 1 is traveling changes based on the detection result of surrounding situation sensor 11 acquired at step not shown. When YES, it proceeds to step S12, while when NO, it proceeds to step S14.

At step S12, the first determination unit 3B clears the determination result that the travel direction of the own lane and the travel direction of the adjoining lane are the same (determination result of step S10). Next, it proceeds to step S13.

At step S13, the traveling control unit 3D restricts the movement (lane change) of the host vehicle 1 from the own lane to the adjoining lane. Next, it proceeds to step S15.

At step S14, the traveling control unit 3D allows the movement (lane change) of the host vehicle 1 from the own lane to the adjoining lane. Next, it proceeds to step S15.

At step S15, for example, the first determination unit 3B determines whether to end the process shown in FIG. 8. When YES, it ends the process shown in FIG. 8 and when NO, it returns to step S10.

In the example shown in FIG. 7 explained above, while the host vehicle 1 is traveling in the area AR7, at step S10 shown in FIG. 8, the first determination unit 3B determines that the travel direction of the own lane L16 and the travel direction of the adjoining lane L26 are the same.

While the host vehicle 1 is traveling in the area AR8, at step S11 shown in FIG. 8, the second determination unit 3C determines that the structure of the road RD6 on which the host vehicle 1 is traveling changes, at step S12 shown in FIG. 8, the first determination unit 3B clears the determination result that the travel direction of the own lane L16 and the travel direction of the adjoining lane L26 are the same (determination result of step S10), at step S13 shown in FIG. 8, the traveling control unit 3D restricts the movement (lane change) of the host vehicle 1 from the own lane L16 to the adjoining lane L26.

While the host vehicle 1 is traveling in the area AR9, for example, at step S10 performed for the second time, the first determination unit 3B determines that the travel direction of the own lane L16 and the travel direction of the adjoining lane L26 are the same.

While the host vehicle 1 is traveling in the area AR10, for example, at step S11 performed for the second time, the second determination unit 3C determines that the structure of the road RD6 on which the host vehicle 1 is traveling does not change.

While the host vehicle 1 is traveling in the area AR11, at step S14 shown in FIG. 8, the traveling control unit 3D allows the movement (lane change) of the host vehicle 1 from the own lane L16 to the adjoining lane L26.

Second Embodiment

The host vehicle 1 to which the traveling control device 14 of a second embodiment is applied is configured in the same way as the host vehicle 1 to which the traveling control device 14 of the first embodiment is applied except for the points explained later.

As explained above, in the example of the host vehicle 1 to which the traveling control device 14 of the first embodiment is applied (example shown in FIG. 1), the traveling control device 14 is configured by the driving assistance ECU.

On the other hand, in one example of the host vehicle 1 to which the traveling control device 14 of the second embodiment is applied, the traveling control device 14 is configured by an autonomous driving ECU. The traveling control device 14, for example, generates a driving plan of the host vehicle 1 based on the information (data, signals) sent from the surrounding situation sensor 11, the vehicle condition sensor 12, and the HMI 13, a GPS (Global Positioning System) signal, map information, etc. Further, the traveling control device 14 controls the steering actuator 15A, the braking actuator 15B, and the drive actuator 15C based on the driving plan.

In the example of the host vehicle 1 to which the traveling control device 14 of the second embodiment is applied, for example, while the host vehicle 1 is traveling in the areas AR7 to AR10, the traveling control device 14 (autonomous driving ECU) generates the driving plan restricting the movement (lane change) of the host vehicle 1 from the own lane L16 to the adjoining lanes L26 (that is, the driving plan where the host vehicle 1 does not perform the lane change) and controls the steering actuator 15A, the braking actuator 15B, and the drive actuator 15C based on the driving plan. For this reason, in the example of the host vehicle 1 to which the traveling control device 14 of the second embodiment is applied, for example, it is possible to suppress that the own vehicle 1 travels on the opposite lanes L36, L46 in reverse after the structure of the road changes after the road structure changes (while the host vehicle 1 is traveling in the areas AR8 to AR10) or the like.

For example, while the host vehicle 1 is traveling in the area AR11, the traveling control device 14 generates the driving plan allowing the movement (lane change) of the host vehicle 1 from the own lane L16 to the adjoining lanes L26 and controls the steering actuator 15A, the braking actuator 15B, and the drive actuator 15C based on the driving plan.

As explained above, the embodiments of the traveling control device, the traveling control method, and the non-transitory recording medium of the present disclosure was explained with reference to the drawings, but the traveling control device, the traveling control method, and the non-transitory recording medium of the present disclosure are not limited to the above-mentioned embodiments and can be suitably changed within an extent not departing from the gist of the present disclosure. The constitutions of the examples of the embodiments explained above may also be suitably combined. In the examples of the embodiments explained above, the process performed in the traveling control device 14 was explained as software process performed by running the program, but the process performed in the traveling control device 14 may also be process performed by hardware. Alternatively, the process performed in the traveling control device 14 may be process combining both software and hardware. Further, the program stored in the memory 142 of the traveling control device 14 (program for realizing the function of the processor 143 of the traveling control device 14) may, for example, be recorded and supplied, distributed, etc. in a computer readable storage medium (non-transitory recording medium) such as semiconductor memory, magnetic recording medium, optical recording medium, or the like.

The invention claimed is:

1. A traveling control device comprising a processor configured to:

determine whether a travel direction of an own lane in which a host vehicle is traveling and the travel direction of an adjoining lane adjoining the own lane are the same;

determine whether structure of a road on which the host vehicle is traveling changes; and restrict movement of the host vehicle from the own lane to the adjoining lane when it is determined that the structure of the road on which the host vehicle is traveling changes after it is determined that the travel direction of the own lane and the travel direction of the adjoining lane are the same.

2. The traveling control device according to claim 1, wherein the processor is configured to clear the determination result that the travel direction of the own lane and the travel direction of the adjoining lane are the same when it is determined that the structure of the road on which the host vehicle is traveling changes after it is determined that the travel direction of the own lane and the travel direction of the adjoining lane are the same.

3. The traveling control device according to claim 2, wherein the processor is configured to again determine whether the travel direction of the own lane and the travel direction of the adjoining lane are the same based on the information obtained after it is determined that the structure of the road on which the host vehicle is traveling changes when it is determined that the structure of the road on which the host vehicle is traveling changes after it is determined that the travel direction of the own lane and the travel direction of the adjoining lane are the same.

4. The traveling control device according to claim 3, wherein the processor is configured to allow the movement of the host vehicle from the own lane to the adjoining lane when it is determined that the structure of the road on which the host vehicle is traveling does not change after it is again determined that the travel direction of the own lane and the travel direction of the adjoining lane are the same.

5. The traveling control device according to claim 1, wherein the processor is configured to determine that the structure of the road on which the host vehicle is traveling changes when the number of lanes included in the road on which the host vehicle is traveling increases.

6. The traveling control device according to claim 1, wherein the processor is configured to determine that the structure of the road on which the host vehicle is traveling changes when the number of lanes included in the road on which the host vehicle is traveling decreases.

7. The traveling control device according to claim 1, wherein the processor is configured to determine that the structure of the road on which the host vehicle is traveling changes when an intersecting road intersecting the road on which the host vehicle is traveling exists.

8. A traveling control method comprising:

determining whether a travel direction of an own lane in which a host vehicle is traveling and the travel direction of an adjoining lane adjoining the own lane are the same;

determining whether structure of a road on which the host vehicle is traveling changes; and restricting movement of the host vehicle from the own lane to the adjoining lane when it is determined that the structure of the road on which the host vehicle is traveling changes after it is determined that the travel direction of the own lane and the travel direction of the adjoining lane are the same.

9. A non-transitory recording medium having recorded thereon a computer program for causing a processor to perform a process comprising:

determining whether a travel direction of an own lane in which a host vehicle is traveling and the travel direction of an adjoining lane adjoining the own lane are the same;

determining whether structure of a road on which the host vehicle is traveling changes; and restricting movement of the host vehicle from the own lane to the adjoining lane when it is determined that the structure of the road on which the host vehicle is traveling changes after it is determined that the travel direction of the own lane and the travel direction of the adjoining lane are the same.

* * * * *